United States Patent
Messmer et al.

(10) Patent No.: US 10,557,455 B2
(45) Date of Patent: Feb. 11, 2020

(54) ROOT INSERT AND A WIND TURBINE HAVING WIND TURBINE BLADES WITH ROOT INSERTS

(71) Applicant: General Electric Company, Schenectady, NY (US)

(72) Inventors: Mathias Ernst Messmer, Bavaria (DE); Stefaan Guido Van Nieuwenhove, Bavaria (DE); Thomas Merzhaeuser, Bavaria (DE); Martin Petersen, Bavaria (DE); Andreas Lutz, Bavaria (DE)

(73) Assignee: General Electric Company, Schenectady, NY (US)

( * ) Notice: Subject to any disclaimer, the term of this patent is extended or adjusted under 35 U.S.C. 154(b) by 260 days.

(21) Appl. No.: 15/633,798

(22) Filed: Jun. 27, 2017

(65) Prior Publication Data

US 2018/0372062 A1 Dec. 27, 2018

(51) Int. Cl.
*F03D 1/06* (2006.01)
*F03D 13/20* (2016.01)

(52) U.S. Cl.
CPC .......... *F03D 1/0658* (2013.01); *F03D 13/20* (2016.05); *F05B 2240/2211* (2013.01); *F05B 2240/912* (2013.01); *F05B 2280/6013* (2013.01)

(58) Field of Classification Search
None
See application file for complete search history.

(56) References Cited

U.S. PATENT DOCUMENTS

| 4,248,062 A * | 2/1981 | McLain ............... B29C 70/085 |
| | | 138/130 |
| 6,704,988 B2 | 3/2004 | Kenney et al. |
| 2010/0084079 A1 | 4/2010 | Hayden et al. |
| 2011/0221093 A1 | 9/2011 | Perrow et al. |
| 2012/0219408 A1 | 8/2012 | Harada et al. |

(Continued)

FOREIGN PATENT DOCUMENTS

| CN | 105508131 A | 4/2016 | |
| DE | 102011051172 A1 * | 12/2012 | ........... F03D 1/0658 |

(Continued)

OTHER PUBLICATIONS

Kaestner, Lars, DE 10 2011 051 172 (machine translation), published Dec. 20, 2012 (Year: 2012).*

(Continued)

*Primary Examiner* — Jason D Shanske
*Assistant Examiner* — Jason G Davis
(74) *Attorney, Agent, or Firm* — Dority & Manning, P.A.

(57) ABSTRACT

A wind turbine is presented. The wind turbine includes a tower, a rotor coupled to the tower, and a plurality of blades coupled to the rotor, wherein each of the plurality of blades comprises a root and a plurality of root inserts positioned circumferentially along the root. Each of the root inserts includes a metal bushing including an outer surface and a plurality of grooves formed at least on the outer surface, a core coupled to the metal bushing, and a plurality of layers wrapped around the metal bushing and the core, wherein a layer of the plurality of layers comprises a different fiber orientation from a fiber orientation of another layer of the plurality of layers.

16 Claims, 6 Drawing Sheets

(56) References Cited

U.S. PATENT DOCUMENTS

2012/0279636 A1 11/2012 Peters et al.
2016/0176127 A1 6/2016 Borsting et al.

FOREIGN PATENT DOCUMENTS

| DK | 201470821 A1 | 1/2016 |
|---|---|---|
| EP | 1 486 415 A1 | 12/2004 |
| EP | 2 952 735 A1 | 12/2015 |
| WO | 2012/140039 A2 | 10/2012 |
| WO | 2012/140062 A2 | 10/2012 |

OTHER PUBLICATIONS

Extended European Search Report and Opinion issued in connection with corresponding EP Application No. 18179520.4 dated Nov. 2, 2018.
Wollner, "Development of a Fabric Winding System for the Automated Manufacture of Prefabricated Wind Turbine Blade Roots", Iowa state University Digital Repository, 2011.
Hazra et al., "An Innovative Cost Effective Approach Towards Tension Control in Automated Filament Winding Composite Manufacturing", 2011 International Conference on Mechatronics and Automation, Aug. 7-11, 2011.
Kadir, "Design and Development of Small Scale 2-Axis Filament Winding Machine", Mechanical System Design, May 1, 2016.

* cited by examiner

ROOT INSERT AND A WIND TURBINE HAVING WIND TURBINE BLADES WITH ROOT INSERTS

BACKGROUND

Embodiments of the present invention generally relate to rotary machines and more specifically to root inserts used in wind turbines.

Wind power is considered one of the cleanest and most environment friendly energy source presently available and hence wind turbines have gained increased attention. A modern wind turbine typically includes a tower, a nacelle, and a rotor. The rotor includes a rotatable hub and a plurality of blades. The blades are coupled to the hub by a blade root. Furthermore, the nacelle may include one or more of a shaft, a generator, and a gearbox. The shaft couples the rotatable hub to the gearbox, or directly to the generator.

The rotor blades capture kinetic energy from wind and convert the kinetic energy of the wind into rotational energy. The rotation of the blades rotates the hub of the rotor. The rotation of the hub rotates the shaft coupling the hub to the gearbox or the generator. Hence, the rotation of the shaft converts mechanical energy to electrical energy. The electrical energy may then be supplied to a utility grid.

The size of the rotor blades is a significant factor contributing to the overall capacity of the wind turbine. Specifically, an increase in the length or span of a rotor blade may generally lead to an overall increase in the energy production of a wind turbine. Accordingly, an increase in the size of the rotor blades is a motivation for adoption of wind turbines as an alternative and commercially competitive energy source. However, the increase in the size of the rotor blades may impose increased loads on various wind turbine components. For example, larger rotor blades may experience increased stresses at a connection (blade joint) between roots of the rotor blades and the hub resulting in fatigue of the blade joints.

Various methods and systems have been devised and implemented to reduce loads/stresses at connection between roots of the rotor blades and the hub. For example, some conventional systems include blades, where each blade includes a root having a flange bolted to the hub. In such systems load on the bolt is not optimally distributed. In other conventional systems, a threaded insert is bonded or infused within a blade root laminate and a bolt (i.e. the load bearing component) is screwed therein. In some other conventional systems, low-cost, low-density foam is inserted between bolt and the blade root laminate. There is a need for an enhanced root insert.

BRIEF DESCRIPTION

In accordance with one embodiment, a wind turbine is disclosed. The wind turbine includes a tower, a rotor coupled to the tower, and a plurality of blades coupled to the rotor, wherein each of the plurality of blades comprises a root and a plurality of root inserts positioned circumferentially along the root. Each of the root inserts includes a metal bushing including an outer surface and a plurality of grooves formed at least on the outer surface, a core coupled to the metal bushing, and a plurality of layers wrapped around the metal bushing and the core, wherein a layer of the plurality of layers comprises a different fiber orientation from a fiber orientation of another layer of the plurality of layers.

In accordance with another embodiment, a root insert is disclosed. The root insert includes a metal bushing comprising an outer surface and a plurality of grooves formed at least on the outer surface, a core coupled to the metal bushing, and a plurality of layers wrapped around the metal bushing and the core, wherein a layer of the plurality of layers comprises a different fiber orientation from a fiber orientation of another layer of the plurality of layers.

In accordance with still another embodiment, a wind turbine is presented. The wind turbine includes a tower, a rotor coupled to the tower, and a plurality of blades coupled to the rotor, wherein each of the plurality of blades comprises a root and a plurality of root inserts positioned circumferentially along the root. Each of the root inserts comprises a metal bushing comprising an outer surface and a plurality of grooves formed at least on the outer surface, a core coupled to the metal bushing, a first layer wrapped around the outer surface of the metal bushing and the core wherein the first layer comprises a first fiber orientation at an angle in a range greater than 0 degrees in magnitude and less than ±90 degrees with respect to a longitudinal axis of the metal bushing, a second layer wrapped around the first layer, wherein the second layer comprises a second fiber orientation at an angle of about ±90 degrees with respect to the longitudinal axis of the metal bushing, a third layer wrapped around the second layer and the first layer, wherein the third layer comprises a third fiber orientation at an angle in a range between 0 degrees to ±90 degrees with respect to the longitudinal axis of the metal bushing, and a cover surrounding the first layer, the second layer, and the third layer.

DRAWINGS

These and other features and aspects of embodiments of the present invention will become better understood when the following detailed description is read with reference to the accompanying drawings in which like characters represent like parts throughout the drawings, wherein.

DETAILED DESCRIPTION

Unless defined otherwise, technical and scientific terms used herein have the same meaning as is commonly understood by one of ordinary skill in the art to which this disclosure belongs. The terms "a" and "an" do not denote a limitation of quantity but rather denote the presence of at least one of the referenced items. The use of "including," "comprising" or "having" and variations thereof herein are meant to encompass the items listed thereafter and equivalents thereof as well as additional items. The terms "control system" or "controller" may include either a single component or a plurality of components, which are either active and/or passive and are connected or otherwise coupled together to provide the described function or functions.

Figure 1:
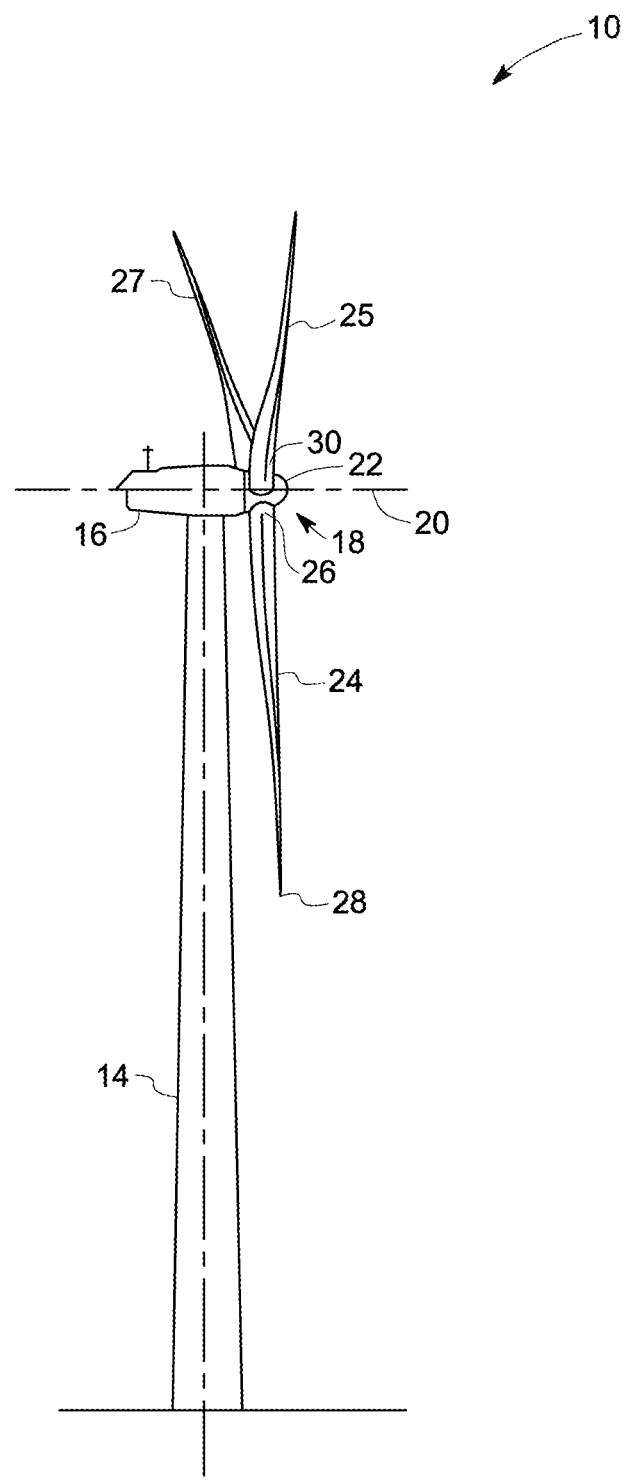
FIG. 1 is a perspective view of a wind turbine in accordance with an exemplary embodiment of the present invention.

FIG. 1 is a perspective view of a wind turbine 10 in accordance with an exemplary embodiment. Although the wind turbine 10 illustrated for purposes of example is a horizontal-axis electrical power generating wind turbine, in some embodiments, the wind turbine 10 may be a vertical-axis configuration and/or a wind mill type wind turbine (not shown). The wind turbine 10 may be coupled to a power grid for supplying electrical power generated by wind turbine 10 thereto. Although only one wind turbine 10 is shown, in some embodiments, a plurality of wind turbines 10 may be grouped together to form a "wind farm."

The wind turbine 10 includes a tower 14, a body 16 (sometimes referred to as a "nacelle"), and a rotor 18 coupled to the body 16 for rotation about an axis of rotation 20. The rotor 18 includes a hub 22 and one or more blades 24, 25, 27 extending radially outwardly from the hub 22 for converting wind kinetic energy into electric power. Each of the blades 24, 25, 27 includes a proximal end and a distal end. For ease of understanding further details of blades are explained with reference to the blade 24. For example, the blade 24 includes a proximal end 26 and a distal end 28. The proximal end 26 of the blade 24 includes a blade root 30 coupled to the hub 22.

Figure 2:
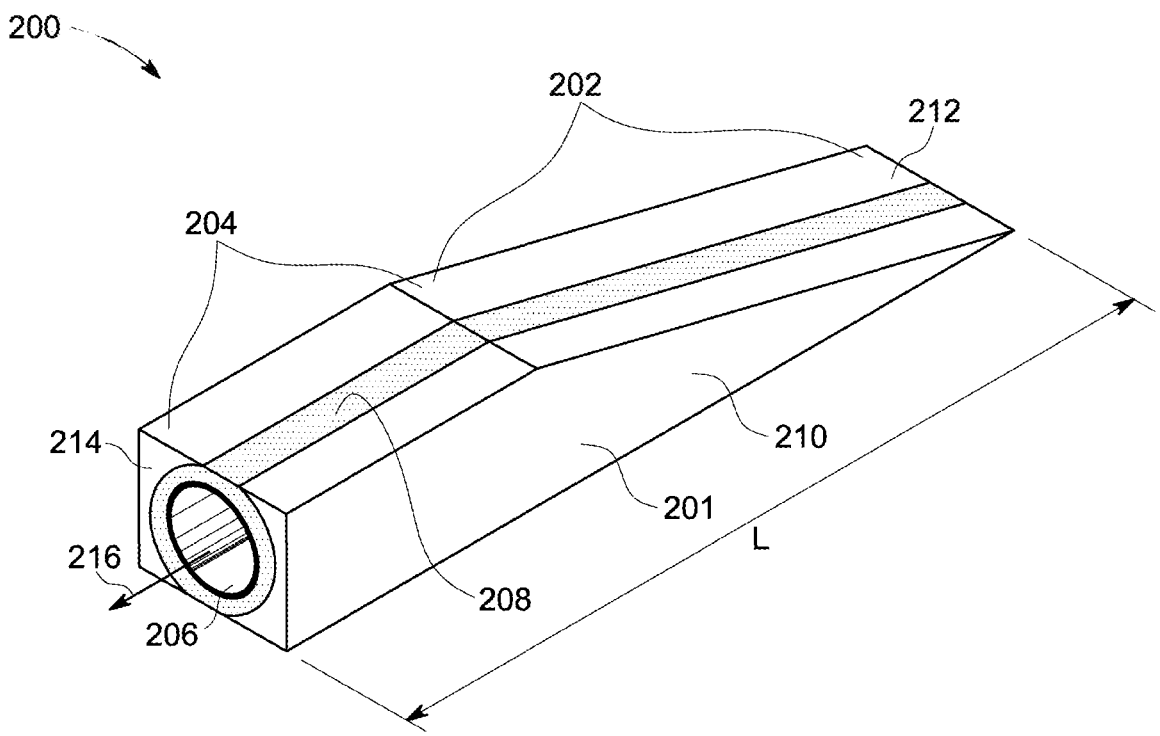
FIG. 2 is a perspective view of a root insert embedded in a blade root of a wind turbine blade in accordance with certain embodiments of the present invention.

FIG. 2 is a perspective view 200 of a root insert 201 of the blade root 30 of one wind turbine blade 24 in accordance with the embodiment of FIG. 1. The blade root 30 (shown in FIG. 1) of each of the blades 24, 25, 27 (shown in FIG. 1) includes a plurality of root inserts 201 used for coupling the blades 24, 25, 27 to the hub 22. Load capability of the blades 24, 25, 27 is dependent on the coupling of the hub 22 to the blades 24. The root inserts 201 facilitate efficient and safe operation of the wind turbine 10.

In the illustrated embodiment, the root insert 201 includes a wedge-like portion 202 and an enlarged portion 204. The shape of the enlarged portion 204 is a rectangular shape. In other embodiments, the shape of the enlarged portion varies depending on the application. In certain embodiments, the shape of the enlarged portion 204 may be a circular shape, an oval shape, a trapezoidal shape, or the like.

As shown in FIG. 2, the root insert 201 includes a metal bushing 206, a plurality of layers 208 wrapped around the metal bushing 206, a core (not visible in FIG. 2, shown in FIG. 4A), and a cover 210 placed around the layers 208. In one embodiment, the cover 210 partially covers the layers 208. In another embodiment, the cover 210 fully covers the layers. The metal bushing 206 is physically coupled to the core. For example, one end of the metal bushing 206 is coupled to one end of the core. By way of a non-limiting example, the core is made of a material including at least one of wood, composite material, polymeric foam, and metals. By way of a non-limiting example, the cover 210 may be made of wood or a composite.

The metal bushing 206 may be a hollow bushing. In the illustrated embodiment, the metal bushing 206 is a cylindrical metal bushing. In other embodiments, the metal bushing 206 may be a square, a rectangle, or another polygonal shaped. The metal bushing 206 is made of a material including at least one of steel, mild steel, iron, and cast and pre-formed metal.

As shown in FIG. 2, the root insert 201 has a length represented by 'L'. Furthermore, the root insert 201 includes an insertion end 212 and an external end 214. During assembling process, the insertion end 212 is inserted inside a blade root of a blade until the length L of the root insert 201 is embedded inside the blade root. After insertion of the root insert 201 inside the blade root, the external end 214 is visible at a proximal end of the blade.

Figure 6:
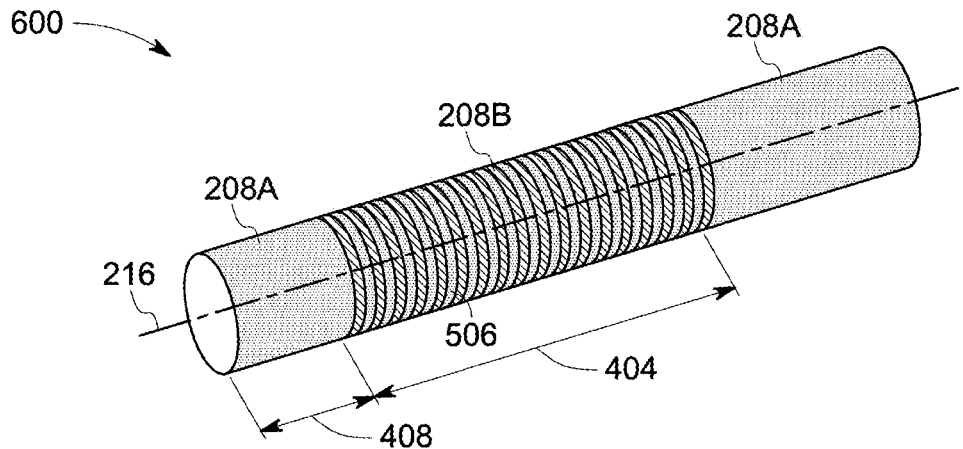
FIG. 6 is a perspective view of a second layer wrapped around a first layer in accordance with certain embodiments of the present invention.
Figure 7A:
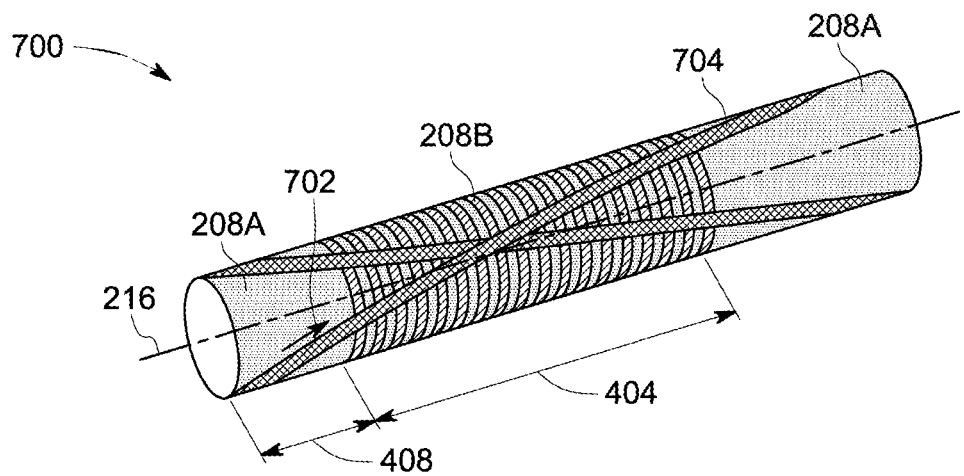
FIG. 7A is a perspective view of a first layer and a second layer wrapped on a metal bushing, and a roving wrapped around the first layer and the second layer to form a third layer.
Figure 7B:
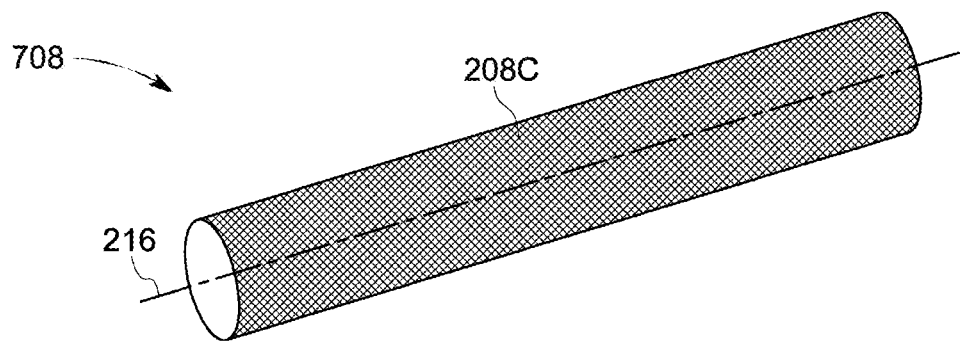
FIG. 7B is a perspective view of a third layer wrapped around a first layer and a second layer in accordance with certain embodiments of the present invention.

The layers 208 at least include three layers including a first layer (shown in FIG. 5A), a second layer (shown in FIG. 6) and a third layer (shown in FIG. 7B). Although three layers are shown, in other embodiments, the number of layers 208 may vary depending on the application. The first layer is wrapped around the metal bushing 206 and the core. The second layer is wrapped around the first layer, and the third layer is wrapped around the first layer and the second layer. Accordingly, the first layer is in physical contact with the metal bushing 206 and the core. Furthermore, the second layer is in physical contact with the first layer, and the third layer is in physical contact with the first layer and the second layer.

The layers 208 may be made of at least one of glass fiber rovings, carbon rovings, aramid rovings, glass fibers, pre-impregnated rovings, wet rovings, dry rovings, hybrid rovings, and rovings with a binder material. In one embodiment, material of rovings used for forming the layers 208 may be same. In another embodiment, a material of a roving used for forming one or more of the layers may be different from a material of another roving used for forming other layers. In one embodiment, at least one of the layers 208 may be made by rovings of different materials. For example, one of the layers 208 may be formed using a first roving made of a first material and a second roving of a second material different from the first material. In one embodiment, one of the layers 208 may be formed by wrappings of carbon rovings around flat surfaces (visible in FIG. 4A) of the metal bushing 206 and wrappings of glass rovings inside the grooves (visible in FIG. 4A). As used herein, the term "flat surface" refers to an outer surface of the metal bushing 206 that does not have grooves.

Each of the layers 208 is characterized by a fiber orientation. For example, the first layer is characterized by a first fiber orientation, the second layer is characterized by a second fiber orientation, and the third layer is characterized by a third fiber orientation. At least one of the layers 208 includes a different fiber orientation from a fiber orientation of another layer. In one embodiment, the first fiber orientation of the first layer may be different from the second fiber orientation of the second layer. In another embodiment, the first fiber orientation may be different from the second fiber orientation and the third fiber orientation may be same as the first fiber orientation. In yet another embodiment, the second fiber orientation may be different from the third fiber orientation. By way of a non-limiting example, each of the first fiber orientation, the second fiber orientation, and the third fiber orientation may be different from each other.

In one embodiment, the first fiber orientation is at an angle in a range greater than 0 degrees in magnitude and less than ±90 degrees with respect to the longitudinal axis 216 of the metal bushing 206. The second fiber orientation is at an angle of about ±90 degrees with respect to the longitudinal axis 216 of the metal bushing 206. The third fiber orientation is at an angle between 0 degrees to ±90 degrees with respect to the longitudinal axis 216 of the metal bushing 206. In another embodiment, the first fiber orientation is at an angle of about ±90 degrees with respect to the longitudinal axis 216 of the metal bushing 206. The second fiber orientation is at an angle in a range greater than 0 degrees in magnitude and less than ±90 degrees with respect to the longitudinal axis 216 of the metal bushing 206. The third fiber orientation is at an angle of about ±90 degrees with respect to the longitudinal axis 216 of the metal bushing. The term "about" may be used to refer to ±10 degrees.

Figure 3A:
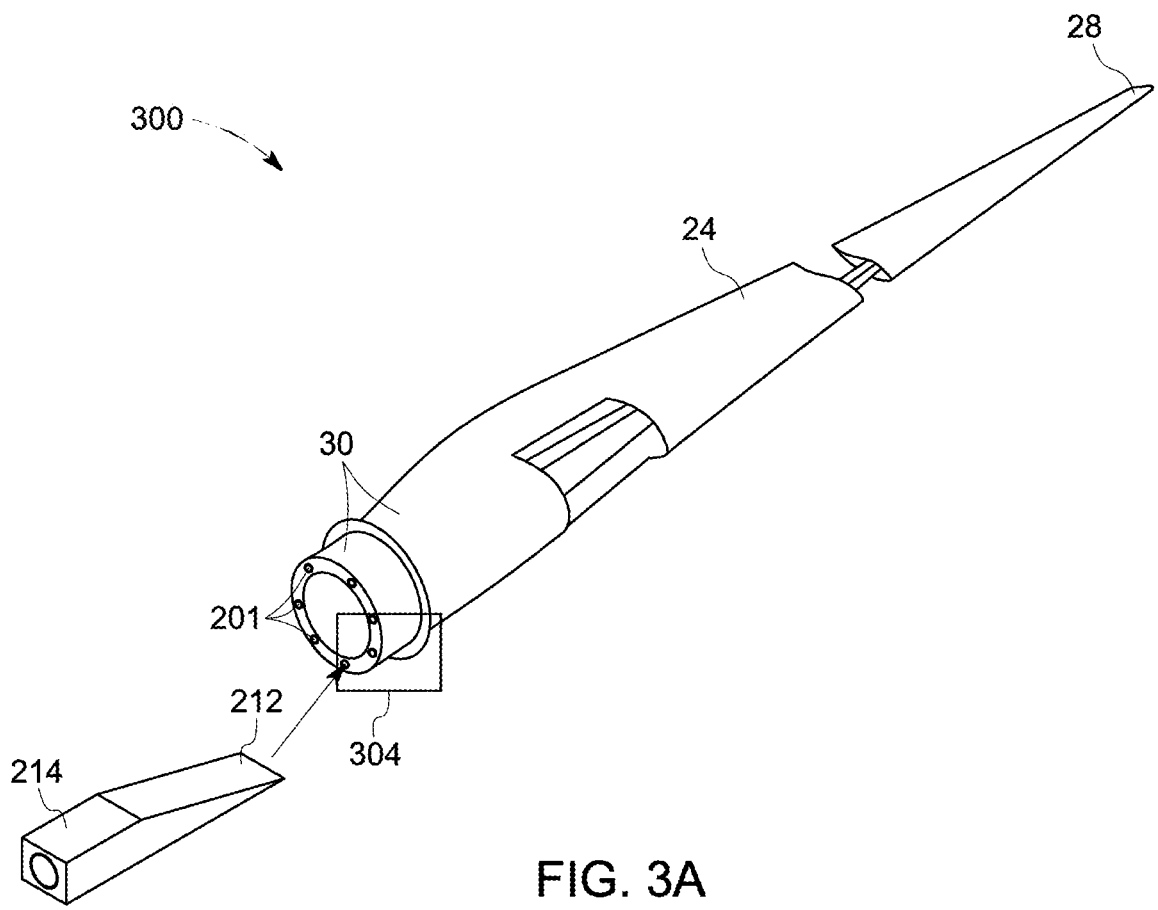
FIG. 3A is a perspective view of a blade having embedded root inserts in accordance with certain embodiments of the present invention.

FIG. 3A is a perspective view 300 of the blade 24 that includes the plurality of embedded root inserts 201 in accordance with certain embodiments of the present invention. The root inserts 201 are embedded in the blade root 30 of the blade 24. Particularly, the root inserts 201 are positioned along a periphery of the blade root 30. In other words, the root inserts 201 are circumferentially positioned along the blade root 30.

As discussed earlier, the root insert 201 includes the insertion end 212 and the external end 214. During assembling process, the insertion end 212 is inserted inside the blade root 30 of the blade until the length L of the root insert 201 is embedded inside the blade root 30. After insertion of the root insert 201 inside the blade root, the external end 214 is visible at a proximal end of the blade.

Figure 3B:
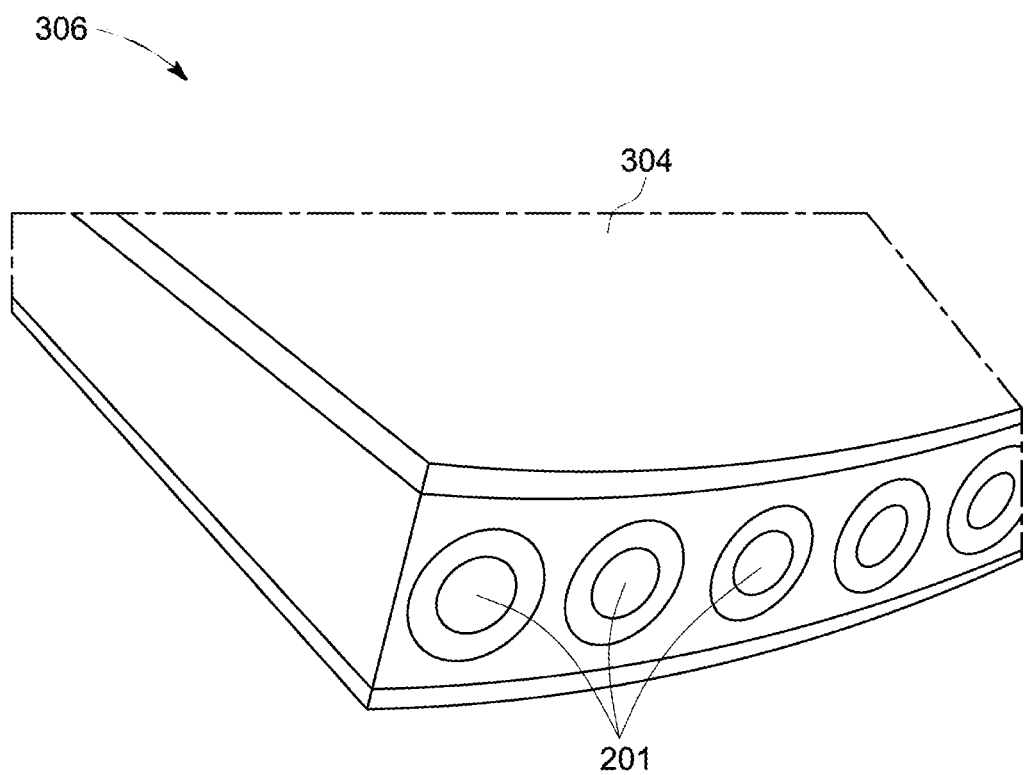
FIG. 3B is a perspective view of a portion of a blade root in accordance with certain embodiments of the present invention.

FIG. 3B shows a perspective view 306 of a portion 304 of the blade root 30 (shown in FIG. 1) in accordance with certain embodiments of the present invention. In the illustrated embodiment, a portion 304 of the blade root 30 including some of the root inserts 201 is depicted. Specifically, the illustrated embodiment shows outer ends of some of the root inserts 201.

Figure 4A:
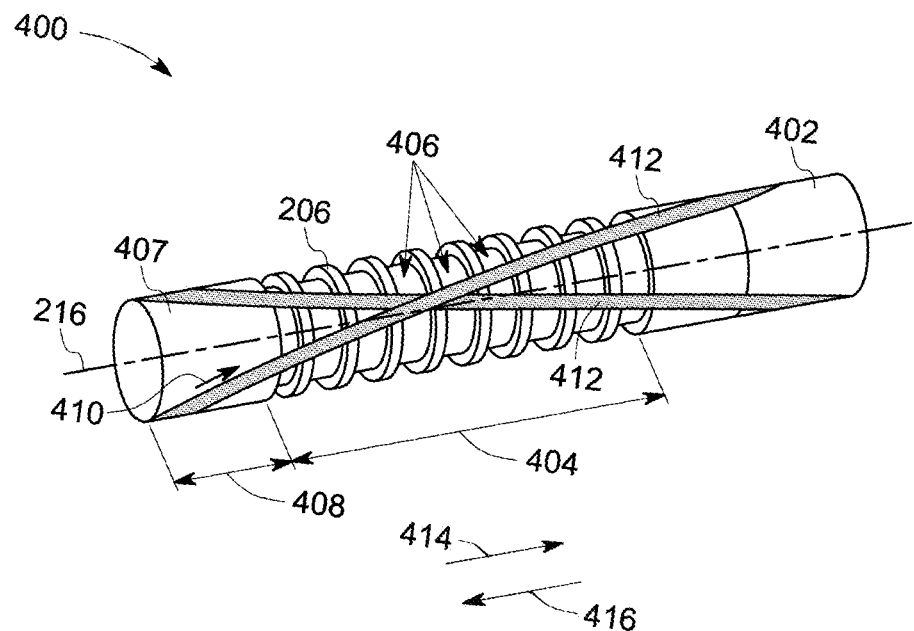
FIG. 4A is a perspective view of a metal bushing and a core in accordance with certain embodiments of the present invention.

FIG. 4A is a perspective view 400 of the metal bushing 206 and a core 402 in accordance with certain embodiments of the present invention. The illustrated embodiment depicts the metal bushing 206 before the layers 208 (shown in FIG. 2) are wrapped around the metal bushing 206. The metal bushing 206 includes a plurality of grooves 406 on a surface of the metal bushing 206. Particularly, the metal bushing 206 includes the plurality of grooves 406 formed on an outer surface 407 of the metal bushing 206. The grooves 406, for example, may be formed parallel to each other. In one embodiment, the grooves 406 may be perpendicular to a longitudinal axis 216 of the metal bushing 206. In another embodiment, the grooves 406 may be helical grooves. A first portion 404 of the metal bushing 206 includes the plurality of grooves 406 and a second portion 408 does not have grooves. The first portion 404 may be interchangeably referred to as grooved surface. The grooves 406 are formed on an outer surface 407 of the metal bushing 206. In certain embodiments, the grooves 406 may additionally be formed on an inner surface of the metal bushing 206. The grooves 406 are formed parallel to each other. In alternative embodiments, the grooves 406 may not be formed parallel to each other. In alternative embodiments, the first portion 404 of the metal bushing 206 includes the grooves 406 having a depth D, and the second portion 408 includes grooves having a depth D'. In one alternative embodiment, the depth D may be different from the depth D'.

The metal bushing 206 is coupled to the core 402. The core 402 may be made of a material including at least one of wood, composite material, and polymeric foam. Furthermore, a roving 412 having a first fiber orientation 410, is wrapped around the metal bushing 206 and the core 402. The roving 412 is wrapped around the metal bushing 206 and the core 402 to form a first layer 208A (shown in FIG. 5A) around the metal bushing 206. The first fiber orientation 410 of the roving 412 may be at an angle in a range greater than 0 degrees in magnitude and less than ±90 degrees with respect to the longitudinal axis 216 of the metal bushing 206. For example, the roving 412 may be wrapped around the metal bushing 206 from a left direction to a right direction 414 at an angle in a range greater than 0 degrees in magnitude and less than ±90 degrees with respect to the longitudinal axis 216. Thereafter, the roving 412 may be wrapped around the metal bushing 206 from the right to the left direction 416 at an angle in a range greater than 0 degrees in magnitude and less than ±90 degrees with respect to the longitudinal axis 216. In one embodiment, the process of wrapping the roving 412 around the metal bushing 206 is continued until the roving 412 covers the outer surface of the metal bushing 206 to form the first layer 208A (shown in FIG. 5A). In another embodiment, the roving 412 may be wrapped around the metal bushing 206 and the core 402 until the first layer 208A has a desired thickness. In still another embodiment, the roving 412 may be wrapped around the metal bushing 206 and the core 402 until the first layer 208A covers the outer surface of the metal bushing 206 from about 50% to about 120%. The first layer 208A is in physical contact with the metal bushing 206 and the core 402. In one embodiment, the sign '+' may represent a fiber orientation from the left direction to the right direction 414, and the sign '−' may represent fiber orientation from the right direction to left direction 416. In an alternative embodiment, the sign '+' may represent a fiber orientation from the right direction to the left direction 416, and the sign '−' may represent fiber orientation from the left direction to right direction 414.

Figure 4B:
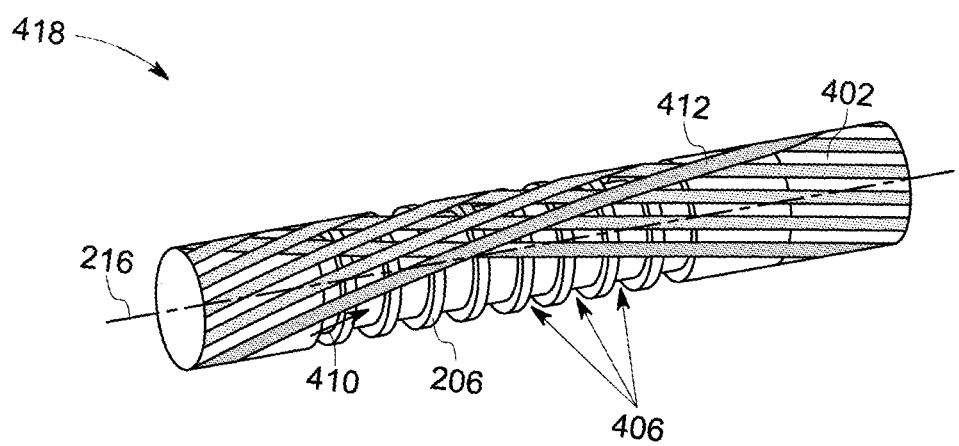
FIG. 4B shows a perspective view of a metal bushing and the core partially covered by a roving in accordance with certain embodiments of the present invention.

FIG. 4B shows a perspective view 418 of the metal bushing 206 and the core 402 partially covered by the roving 412 in accordance with certain embodiments of the present invention. With reference to both FIGS. 4A and 4B, the first fiber orientation 410 of the roving 412 is not parallel to the grooves 406. Hence, the roving 412 does not occupy the grooves 406.

Figure 4C:
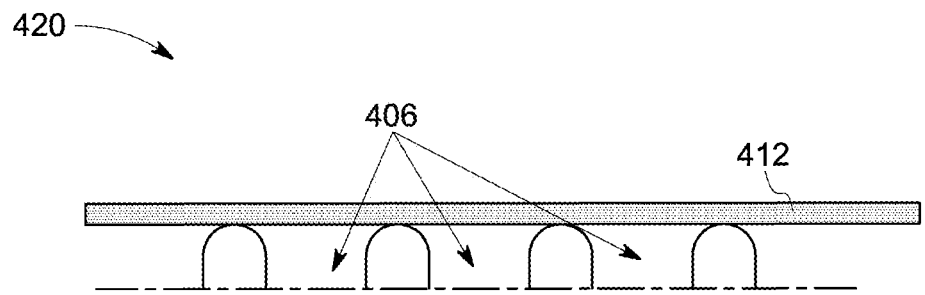
FIG. 4C is a schematic illustration of a portion of a metal bushing depicting a roving wrapped around grooves of a metal bushing in accordance with certain embodiments of the present invention.

FIG. 4C is a schematic illustration 420 of a portion of the metal bushing 206 depicting the roving 412 wrapped around the grooves 406 of the metal bushing 206 in accordance with certain embodiments of the present invention. As discussed earlier, the roving 412 does not occupy the grooves 406.

Figure 5A:
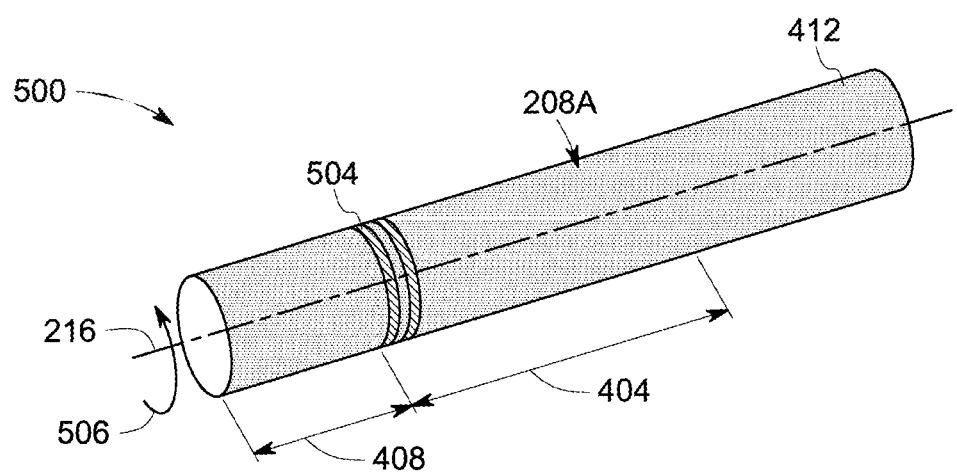
FIG. 5A is a perspective view of a first layer wrapped around a metal bushing and a core in accordance with certain embodiments of the present invention.

FIG. 5A is a perspective view 500 of the first layer 208A wrapped around the metal bushing 206 (shown in FIG. 4A) and the core 402 (shown in FIG. 4A) in accordance with certain embodiments of the present invention. In the illustrated embodiment, the metal bushing 206 and the core 402 are not visible due to the wrapping of the first layer 208A. Furthermore, a roving 504 having a second fiber orientation 506 is depicted. The roving 504 is wrapped around the first layer 208A to form a second layer 208B (shown in FIG. 6) around the first layer 208A. In the illustrated embodiment, the roving 504 is wrapped around the first portion 404 of the metal bushing 206 including the grooves 406 (not visible in FIG. 5A due to wrapping of the first layer 208A, shown in FIG. 4A). Particularly, the roving 504 occupies the grooves 406 of the metal bushing 206. The second fiber orientation 506 of the second layer 208B is at an angle of about ±90 degrees with respect to the longitudinal axis 216 of the metal bushing 206 (not visible in FIG. 5A due to the wrapping of the first layer 208A). Particularly, the first fiber orientation 410 (shown in FIG. 4A) of the first layer 208A is at an angle in a range greater than 0 degrees in magnitude and less than ±90 degrees with respect to the longitudinal axis 216 of the metal bushing 206. The second fiber orientation 506 of the second layer 208B is at an angle of about ±90 degrees with respect to the longitudinal axis 216 of the metal bushing 206.

In one embodiment, the roving 504 may be wrapped around the first layer 208A until the thickness of the first layer 208A and the second layer 208B occupying the grooves 406 (shown in FIG. 4A) is equal to a desired thickness. In another embodiment, the roving 504 may be wrapped around the first layer 208A until the first layer 208A and the second layer 208B fully or partially occupies the grooves 406. The second layer 208B is in physical contact with the first layer 208A.

The first layer 208A does not occupy the grooves 406 due to the first fiber orientation 410 of the roving 412. However, wrappings of the second layer 208B around the first layer 208A results in the grooves 406 being occupied by the first layer 208A. Particularly, the second fiber orientation 506 of the second layer 208B results in pushing the first layer 208A into the grooves 406. In other words, the second fiber orientation 506 of the second layer 208B applies force on the first layer 208A to push the first layer 208A into the grooves 406.

Figure 5B:
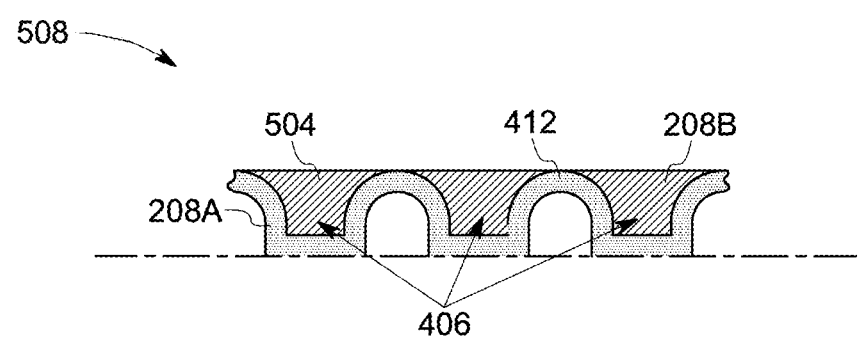
FIG. 5B is a diagrammatic illustration of a portion of a metal bushing depicting a roving of a first layer being pulled inside grooves in accordance with certain embodiments of the present invention.

FIG. 5B is a diagrammatic illustration 508 of a portion of the metal bushing 206 (shown in FIG. 4A) depicting the roving 412 of the first layer 208A being pushed inside the grooves 406 by the second layer 208B in accordance with certain embodiments of the present invention. As shown in FIG. 5B, the wrapping of the roving 504 of the second layer 208B around the roving 412 of the first layer 208A pushes the roving 412 into the grooves 406.

FIG. 6 is a perspective view 600 of the second layer 208B wrapped around the first layer 208A in accordance with certain embodiments of the present invention. In the illustrated embodiment, the first fiber orientation 410 (see FIG. 4A) of the first layer 208A may at an angle in a range greater than 0 degrees in magnitude and less than ±90 degrees with respect to the longitudinal axis 216. The second fiber orientation 506 (see FIG. 5A) of the second layer 208B may be at an angle of about ±90 degrees with respect to the longitudinal axis 216 of the metal bushing 206. In an alternative embodiment, the first fiber orientation may be at an angle of about ±90 degrees with respect to the longitudinal axis 216 of the metal bushing 206, and the second fiber orientation may be at an angle in a range greater than 0 degrees in magnitude and less than ±90 degrees with respect to the longitudinal axis 216 of the metal bushing 206.

FIG. 7A is a perspective view 700 of the first layer 208A and the second layer 208B wrapped on the metal bushing 206 and the core 402 (shown in FIG. 4A). In the illustrated embodiment, additionally, a roving 704 having a third fiber orientation 702 wrapped around the first layer 208A and the second layer 208B to form a third layer 208C (shown in FIG. 7B). The roving 704 of the third layer 208C may be similar to one or both of the roving 504 of the second layer 208B and the roving 412 of the first layer 208A.

FIG. 7B is a perspective view 708 of the third layer 208C wrapped around the first layer 208A and the second layer 208B in accordance with certain embodiments of the present invention. In the embodiment of FIGS. 7A and 7B, the third layer 208C has the third fiber orientation 702 at an angle between 0 degrees to ±90 degrees with respect to the longitudinal axis 216 of the metal bushing 206 (shown in FIG. 4A). In another embodiment, the third fiber orientation 702 of the third layer 208C may be at an angle of about ±90 degrees. The third layer 208C is in physical contact with the first layer 208A and the second layer 208B.

The present systems and methods provide wind blade root inserts with increased load intake capability at lower weight, and competitive cost compared to conventional root inserts. The root inserts include multiple layers with different fiber orientations. The different fiber orientations of the layers create a geometric interlock between the layers and hence increases the load intake capability of the root inserts.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A wind turbine comprising:
   a tower;
   a rotor coupled to the tower; and
   a plurality of blades coupled to the rotor, wherein each of the plurality of blades comprises a root and a plurality of root inserts positioned circumferentially along the root, wherein each of the root inserts comprises:
      a metal bushing comprising an outer surface and a plurality of grooves formed at least on the outer surface, the plurality of grooves comprising parallel grooves having a helical or perpendicular orientation with respect to a longitudinal axis of the metal bushing;
      a core coupled to the metal bushing;
      a plurality of layers wrapped around the metal bushing and the core,
   wherein a layer of the plurality of layers comprises a different fiber orientation from a fiber orientation of another layer of the plurality of layers;
   wherein the plurality of layers comprises:
      a first layer in physical contact with the metal bushing and the core, the first layer comprising a first fiber orientation non-parallel to the orientation of the grooves so as to cross over the grooves;
      a second layer wrapped around and in physical contact with the first layer, the second layer comprising a second fiber orientation non-parallel to the first fiber orientation; and
      wherein the first layer occupies the plurality of grooves due to the second fiber orientation of the second layer around the first layer and a force applied by the wrapping of the second layer on the first layer.

2. The wind turbine of claim 1, wherein the first layer comprises the first fiber orientation at an angle in a range greater than 0 degrees in magnitude and less than ±90 degrees with respect to the longitudinal axis of the metal bushing and wherein the second layer comprises the second fiber orientation at an angle of about ±90 degrees with respect to the longitudinal axis of the metal bushing; or the first fiber orientation comprises the angle of about ±90 degrees with respect to the longitudinal axis of the metal bushing, and the second fiber orientation comprises a range greater than 0 degrees in magnitude and less than ±90 degrees with respect to the longitudinal axis of the metal bushing.

3. The wind turbine of claim 1, wherein the plurality of layers further comprises a third layer wrapped around and in physical contact with the first layer and the second layer.

4. The wind turbine of claim 3, wherein the third layer comprises a third fiber orientation at an angle between 0 degrees to ±90 degrees with respect to the longitudinal axis of the metal bushing.

5. The wind turbine of claim 4, wherein the third fiber orientation of the third layer is same as the first fiber orientation of the first layer.

6. The wind turbine of claim 4, wherein the third fiber orientation of the third layer is different from the first fiber orientation of the first layer.

7. The wind turbine of claim 3, further comprising:
a cover surrounding the first layer, the second layer, and the third layer.

8. The wind turbine of claim 1, wherein the outer surface of the metal bushing comprises a flat surface and a grooved surface comprising the plurality of grooves.

9. The wind turbine of claim 8, wherein the second layer is wrapped around a portion of the first layer that covers the grooved surface.

10. The wind turbine of claim 1, wherein at least one of the plurality of layers comprises at least one of glass fiber rovings, carbon rovings, aramid rovings, glass fibers, pre-impregnated rovings, wet rovings, dry rovings, hybrid rovings, and rovings with a binder material.

11. The wind turbine of claim 10, wherein the plurality of layers comprises carbon rovings wrapped around flat surfaces of the metal bushing, and wrappings of glass rovings occupying the plurality of grooves of the metal bushing.

12. The wind turbine of claim 1, wherein the plurality of layers comprises a plurality of rovings made of same material.

13. The wind turbine of claim 1, wherein a material of a roving of one of the plurality of layers is different from a material of other layers of the plurality of layers.

14. The wind turbine of claim 1, wherein one of the plurality of layers comprises a first roving and a second roving, wherein the first roving comprises a first material and the second roving comprises a second material different from the first material.

15. A root insert comprising:
a metal bushing comprising an outer surface and a plurality of grooves formed at least on the outer surface, the plurality of grooves comprising parallel grooves having a helical or perpendicular orientation with respect to a longitudinal axis of the metal bushing;
a core coupled to the metal bushing; and
a plurality of layers wrapped around the metal bushing and the core,
wherein a layer of the plurality of layers comprises a different fiber orientation from a fiber orientation of another layer of the plurality of layers;
wherein the plurality of layers comprises:
a first layer in physical contact with the metal bushing and the core, the first layer comprising a first fiber orientation non-parallel to the orientation of the grooves so as to cross over the grooves;
a second layer wrapped around and in physical contact with the first layer, the second layer comprising a second fiber orientation non-parallel to the first fiber orientation; and
wherein the first layer occupies the plurality of grooves due to the second fiber orientation of the second layer around the first layer and a force applied by the wrapping of the second layer on the first layer.

16. The root insert of claim 15,
wherein the first layer comprises the first fiber orientation at an angle in a range greater than 0 degrees in magnitude and less than ±90 degrees with respect to the longitudinal axis of the metal bushing and wherein the second layer comprises the second fiber orientation at an angle of about ±90 degrees with respect to the longitudinal axis of the metal bushing; or the first fiber orientation comprises the angle of about ±90 degrees with respect to the longitudinal axis of the metal bushing, and the second fiber orientation comprises a range greater than 0 degrees in magnitude and less than ±90 degrees with respect to the longitudinal axis of the metal bushing.

* * * * *